July 28, 1942.  H. F. PASCHAL  2,291,057
APPARATUS FOR MAKING MINIATURE HOUSE MEMBERS
Filed Oct. 20, 1939  2 Sheets-Sheet 1
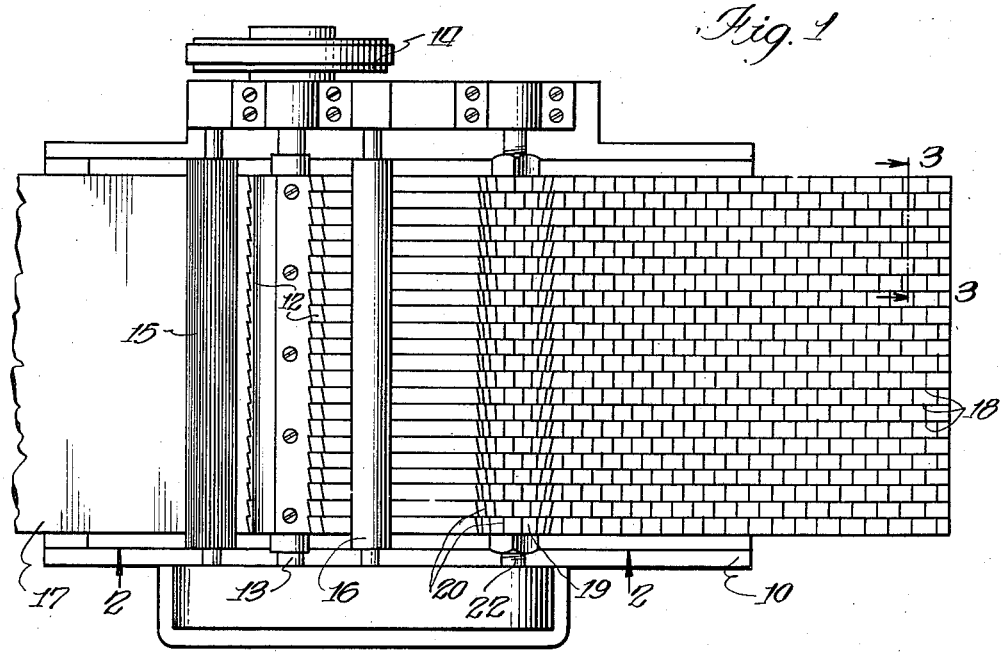
Fig. 1
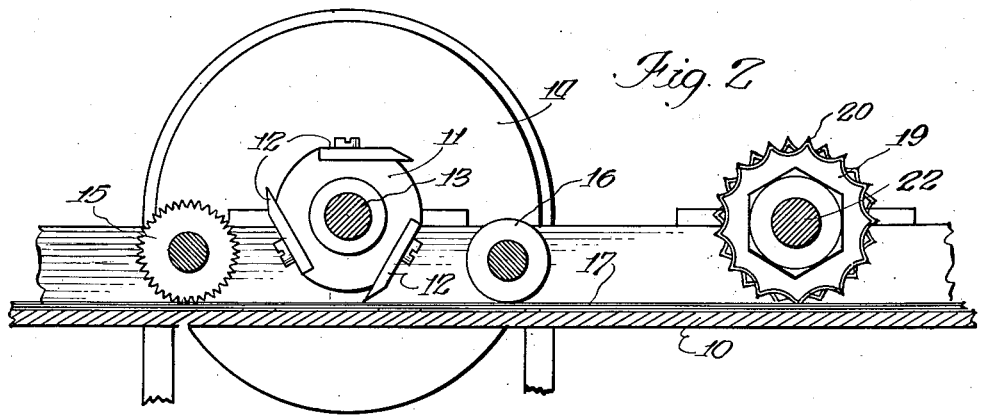
Fig. 2
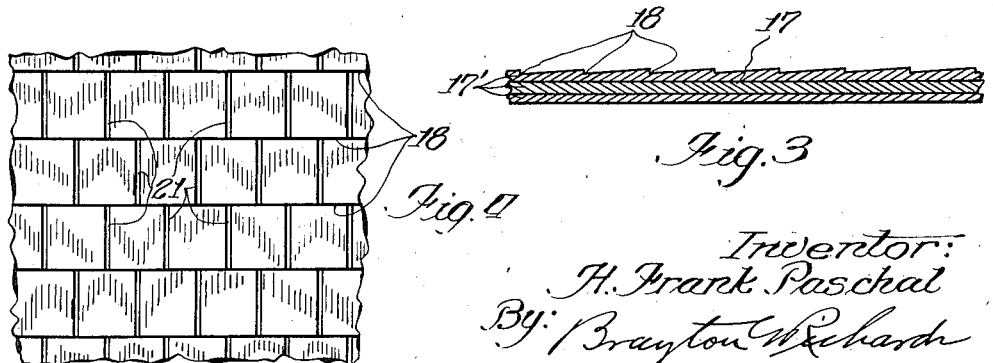
Fig. 3
Fig. 4
Inventor:
H. Frank Paschal
By: Brayton Richards
Attorney.

July 28, 1942.   H. F. PASCHAL   2,291,057
APPARATUS FOR MAKING MINIATURE HOUSE MEMBERS
Filed Oct. 20, 1939   2 Sheets-Sheet 2

Inventor:
H. Frank Paschal
By: Brayton Richards
Attorney.

Patented July 28, 1942

2,291,057

UNITED STATES PATENT OFFICE 2,291,057

APPARATUS FOR MAKING MINIATURE HOUSE MEMBERS

Herbert Frank Paschal, Chicago, Ill., assignor, by mesne assignments, to Leslie S. Janes, Tinley Park, Ill.

Application October 20, 1939, Serial No. 300,385

2 Claims. (Cl. 144—3)

The invention relates to improvements in apparatus for making miniature house members, the primary object of the invention being the provision of miniature house members which may be produced at small cost and yet impart a natural appearance to the house when completed. Other objects of the invention will appear hereinafter.

The invention consists in the apparatus hereinafter described and claimed.

The invention will be best understood by reference to the accompanying drawings, in which—

Figure 5:
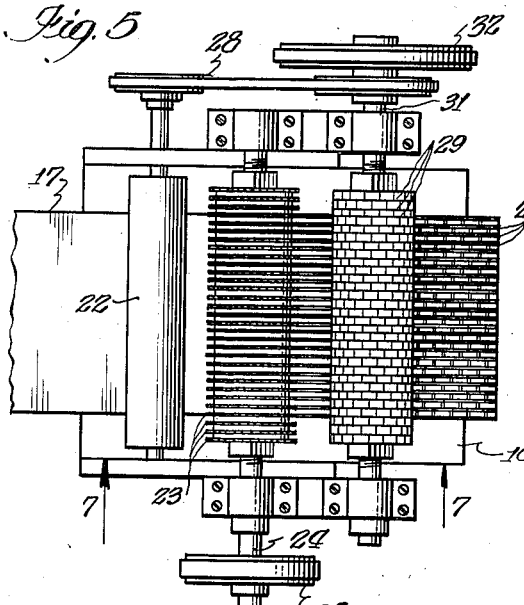
Figure 6:
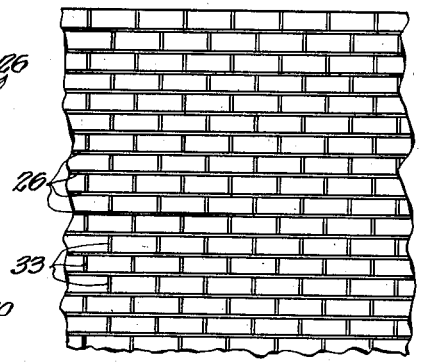
Figure 7:
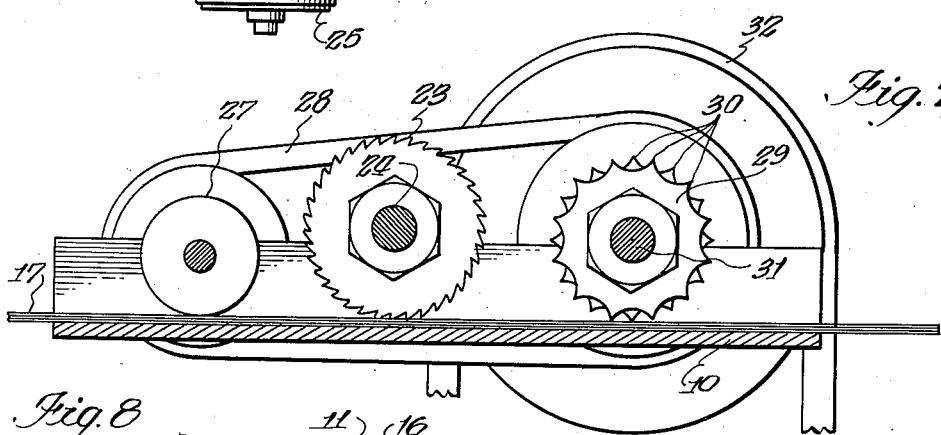
Figure 8:
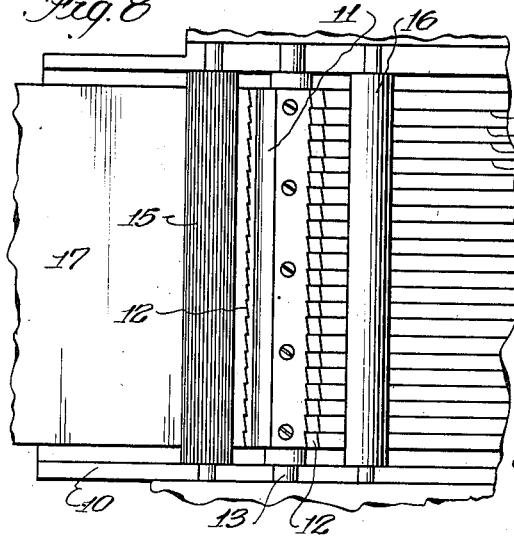

Figure 1 is a partial top plan view of apparatus for producing one form of a miniature house member;

Figure 2, an enlarged partial longitudinal section taken substantially on line 2—2 of Fig. 1;

Figure 3, an enlarged transverse section taken substantially on line 3—3 of Fig. 1;

Figure 4, an enlarged top plan view of a portion of the part produced by the apparatus illustrated in Figs. 1 and 2;

Figure 5, a partial top plan view of a modified form of apparatus for producing a different form of house member;

Figure 6, an enlarged partial top plan view of a section of the material produced by the apparatus illustrated in Fig. 5;

Figure 7, an enlarged section taken substantially on line 7—7 of Fig. 5;

Figure 8, a partial top plan view of another modified form of apparatus, and

Figure 9:
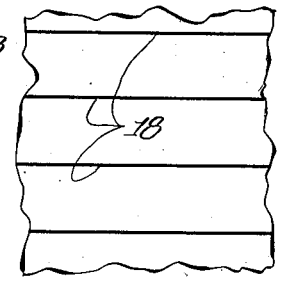

Figure 9, an enlarged top plan view of a section of the material produced by the apparatus illustrated in Fig. 8.

The form of apparatus illustrated in Figures 1 and 2 comprises a suitable table member 10 having a revolving cutter head 11 associated therewith as shown, and provided with a plurality of cutter blades 12 having serrated edges, as indicated in Figure 1. The cutter head 11 is mounted upon the revolving shaft 13 driven by a pulley 14, as will be readily understood. The serrated feed-in and guide roller 15 and the smooth feed-out and guide roller 16 are arranged as shown and co-operate with the table 10 in the feeding of a sheet of material 17 past the cutter head 11 to form the parallel grooves 18 therein having inclined bottoms as shown.

A marking roller is arranged as shown to co-operate with the cutter head 11. This marking roller is made up of a plurality of disc-like sections 19 of substantially the same width as the grooves 18 and provided with marking projections 20 arranged to produce the transverse indentations 21 in the bottoms of the grooves 18 as shown. The sections 19 are arranged as indicated upon a transverse shaft 22 with the sections 19 aligning with the grooves 18 so as to place the indentations 21 in the bottoms of said grooves.

The sheet 17 is made up of three plies 17' of comparatively heavy veneer sheets glued together in the usual way, the topmost ply being of sufficient thickness to receive the grooves 18 without being cut entirely through by said grooves, and said grooves are cut in the topmost ply transversely of the grain so as to give a shingle-effect appearance to the completed outer surface of the sheet 17. Sheet 17 is made of a size to constitute the entire outer part, such as a section of the roof or the section of a wall of a miniature house and, as made, will give the appearance of individual shingles assembled to constitute the roof or wall of the house.

In the form of apparatus illustrated in Figures 5 and 6 the cutter head is made up of a plurality of circular saws 23 mounted on the shaft 24 in co-operative relation with the table top 10. The shaft 24 is driven by a pulley 25 so as to cause the saws 23 to cut narrow parallel grooves 26 in the surface of the sheet 17 as it passes through the apparatus. A smooth feed-in and guide roller 27 is arranged to co-operate with the saws 23 without marring the surface of the sheet 17 and is positively driven by a belt 28 as indicated. In this instance the marking roller is made up of a plurality of sections 29 each having circumferentially spaced marking projections 30 provided with indenting edges extending axially, said sections being mounted upon a transverse shaft 31 driven by a pulley 32 as indicated. The sections 29 are arranged on the shaft 31 in alignment with the spaces between the grooves 26 and are adapted to impress transverse indentations 33 in the surface of the sheet 17 between the grooves 26, thereby giving the appearance of a brick construction as indicated in Fig. 6.

The form of apparatus illustrated in Figure 8 is the same as that illustrated in Figures 1 and 2, except that the marking roller 2 has been omitted so that the sheet produced by this form of apparatus will have merely the grooves 18 formed therein, thus giving the appearance of a weatherboard construction.

While I have illustrated and described the preferred forms of parts and apparatus and method of procedure, these are capable of variation and modification without departing from the spirit of the invention. I therefore do not wish to be limited to the precise details disclosed, but desire to avail myself of such variations and modifications as fall within the scope of the appended claims.

I claim:

1. Apparatus of the class described comprising a revolving cutter head having a plurality of radially projecting cutters spaced axially from each other and arranged to cut parallel grooves in the surface of a sheet of material; and a revolving marking member having a plurality of sets of indenting elements arranged in alignment with the spaces between said cutters and having circumferentially spaced indenting projections arranged to impress indentations in the surface of said sheet transversely between and with respect to said grooves.

2. The apparatus specified in claim 1 in which the cutter head is arranged to operate on the sheet ahead of the marking member.

H. FRANK PASCHAL.